(12) United States Patent
Murschall et al.

(10) Patent No.: US 6,841,222 B2
(45) Date of Patent: Jan. 11, 2005

(54) WHITE, SEALABLE, FLAME-RETARDANT, BIAXIALLY ORIENTED POLYESTER FILM, ITS USE AND PROCESS FOR ITS PRODUCTION

(75) Inventors: Ursula Murschall, Nierstein (DE); Klaus Oberlaender, Wiesbaden (DE); Guenther Crass, Taunusstein (DE); Ulrich Kern, Ingelheim (DE); Herbert Peiffer, Mainz (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 10/182,340

(22) PCT Filed: Feb. 7, 2001

(86) PCT No.: PCT/EP01/01304

§ 371 (c)(1),
(2), (4) Date: Jul. 26, 2002

(87) PCT Pub. No.: WO01/60609

PCT Pub. Date: Aug. 23, 2001

(65) Prior Publication Data

US 2003/0049472 A1 Mar. 13, 2003

(30) Foreign Application Priority Data

Feb. 19, 2000 (DE) .......................................... 100 07 728

(51) Int. Cl.$^7$ .......................... B32B 27/08; B32B 27/20; B32B 27/36; B32B 31/30; B32B 27/18

(52) U.S. Cl. ....................... 428/141; 428/343; 428/346; 428/347; 428/349; 428/212; 428/213; 428/214; 428/215; 428/216; 428/323; 428/328; 428/480; 428/910; 264/288.4; 264/290.2; 106/15.05; 106/18.11; 106/18.14; 106/18.18; 106/18.31

(58) Field of Search ................................. 428/141, 343, 428/346, 347, 349, 212, 213, 214, 215, 216, 323, 328, 480, 910; 264/288.4, 290.2; 106/15.05, 18.11, 18.14, 18.31, 8.18

(56) References Cited

U.S. PATENT DOCUMENTS

| | | | | |
|---|---|---|---|---|
| 5,173,357 A | * | 12/1992 | Nakane et al. | 428/220 |
| 5,521,236 A | * | 5/1996 | Moy et al. | 524/101 |
| 5,955,181 A | * | 9/1999 | Peiffer et al. | 428/212 |
| 6,423,401 B2 | * | 7/2002 | Peiffer et al. | 428/216 |
| 6,649,247 B2 | * | 11/2003 | Murschall et al. | 428/141 |
| 6,663,977 B2 | * | 12/2003 | Kurian et al. | 428/480 |
| 2002/0114944 A1 | * | 8/2002 | Peiffer et al. | 428/336 |
| 2003/0054129 A1 | * | 3/2003 | Murschall et al. | 428/97 |
| 2003/0064195 A1 | * | 4/2003 | Murschall et al. | 428/141 |
| 2003/0118817 A1 | * | 6/2003 | Murschall et al. | 428/395 |
| 2004/0009342 A1 | * | 1/2004 | Janssens et al. | 428/323 |
| 2004/0009355 A1 | * | 1/2004 | Janssens et al. | 428/430 |

FOREIGN PATENT DOCUMENTS

| | | | |
|---|---|---|---|
| DE | 23 46 787 A1 | | 3/1975 |
| DE | 4119218 A1 | * | 12/1992 |
| DE | 198 27 845 A1 | | 12/1999 |
| EP | 0 035 835 A1 | | 9/1981 |
| EP | 0 432 886 A2 | | 6/1991 |
| EP | 0 515 096 A2 | * | 11/1992 |
| EP | 0 947 982 A2 | | 10/1999 |
| GB | 1 465 973 | | 3/1977 |
| GB | 2 344 596 A | | 6/2000 |
| WO | WO 98/06575 A1 | | 2/1998 |

OTHER PUBLICATIONS

Werner, Eberhard et al., "Polyester, Films." Encyclopedia of Polymers Science and Engineering, vol. 12 (1988), pp. 193–216.*

* cited by examiner

*Primary Examiner*—Vivian Chen
(74) *Attorney, Agent, or Firm*—ProPat, L.L.C.

(57) ABSTRACT

The invention relates to a white, sealable, flame-retardant coextruded, biaxially oriented polyester film composed of at least one base layer B and of outer layers A and B applied to the two sides of this base layer. The film also comprises at least one flame retardant and one white pigment. The invention also includes the use of the film and a process for its production.

34 Claims, No Drawings

WHITE, SEALABLE, FLAME-RETARDANT, BIAXIALLY ORIENTED POLYESTER FILM, ITS USE AND PROCESS FOR ITS PRODUCTION

The invention relates to a white, sealable, flame-retardant coextruded, biaxially oriented polyester film composed of at least one base layer B and of outer layers A and B applied to the two sides of this base layer. The film also comprises at least one flame retardant and one white pigment. The invention also includes the use of the film and a process for its production.

BACKGROUND OF THE INVENTION

The films, and items produced therefrom, are particularly suitable for applications where flame protection or flame retardancy is demanded.

The film has a characteristic white appearance, making it particularly attractive is for the applications mentioned.

Sealable, biaxially oriented polyester films are known from the prior art. There are also known sealable, biaxially oriented polyester films which have been provided with one or more UV absorbers. These films known from the prior art either have good sealing performance, good optical properties, or acceptable processing performance.

GB-A 1465 973 describes a coextruded, two-layer polyester film in which one layer is composed of isophthalic-acid-containing and terephthalic-acid-containing copolyesters and the other layer is composed of polyethylene terephthalate. The specification gives no useful data concerning the sealing performance of the film. The film cannot be produced in a reliable process due to lack of pigmentation (the film cannot be wound) and it has restricted further processing capability.

EP-A 0 035 835 describes a coextruded sealable polyester film, the sealable layer of which has admixed particles to improve winding and processing performance, the average particle size exceeding the thickness of the sealable layer. The particulate additives form surface protrusions which inhibit undesired blocking and sticking to rolls or guides. No further information is provided on the incorporation of antiblocking agents with regard to the other, nonsealable layer of the film. It remains uncertain whether this layer comprises antiblocking agents. The use of particles having a larger diameter than the sealing layer and of the concentrations reported in the examples has an adverse effect on the sealing characteristics of the film. The specification provides no information on the sealing temperature range of the film. Seal seam strength is measured at 140° C. and found to be in the range from 63 to 120 N/m (0.97 to 1.8 N/15 mm of film width).

EP-A 0 432 886 describes a coextruded, multilayer polyester film which has a first surface on which has been arranged a sealable layer, and has a second surface on which has been arranged an acrylate layer. The sealable outer layer here may also be composed of isophthalic-acid-containing and terephthalic-acid-containing copolyesters. The coating on the reverse side gives the film improved processing performance. The patent gives no indication of the sealing range of the film. The seal seam strength is measured at 140° C. For a sealable layer thickness of 11 μm the seal seam strength given is 761.5 N/m (11.4 N/15 mm). A disadvantage of the reverse-side acrylate coating is that this side is now not sealable with respect to the sealable outer layer, and the film therefore has only very restricted use.

EP-A 0 515 096 describes a coextruded, multilayer, sealable polyester film which comprises a further additive on the sealable layer. The additive may comprise inorganic particles, for example, and is preferably applied in an aqueous layer to the film during its production. Using this method, the film is claimed to retain its good sealing properties and to be easy to process. The reverse side comprises only very few particles, most of which pass into this layer via the recycled material. This patent again gives no indication of the sealing temperature range of the film. The seal seam strength is measured at 140° C. and is above 200 N/m (3 N/15 mm). For a sealable layer of 3 μm thickness the seal seam strength given is 275 N/m (4.125 N/15 mm).

WO 98/06575 describes a coextruded, multilayer polyester film which comprises a sealable outer layer and a nonsealable base layer. The base layer here may have been built up from one or more layers, and one of these layers is in contact with the sealable layer. The other (outward-facing) layer then forms the second nonsealable outer layer. Here, too, the sealable outer layer may be composed of isophthalic-acid-containing and terephthalic-acid-containing copolyesters, but these comprise no antiblocking particles. The film also comprises at least one UV absorber, which is added to the base layer in a weight ratio of from 0.1 to 10%. UV absorbers used here are preferably triazine, e.g. ®Tinuvin 1577 from Ciba Geiby (Basle, Switzerland). The base layer of this film has conventional antiblocking agents. The film has good sealability, but does not have the desired processing performance and has shortcomings in optical properties. The film may also have a matt surface, but then has high haze, which is undesirable.

DE-A 2346 787 describes a flame-retardant polymer. Besides the polymer, its use is also claimed for producing films and fibers. The following shortcomings were apparent when producing films with this claimed phospholane-modified polymer:

The polymer mentioned is susceptible to hydrolysis and has to be very thoroughly predried. When the polymer is dried using prior-art s it cakes, and it is therefore very difficult to produce a film.

The films produced under uneconomic conditions embrittle when exposed to heat, i.e. mechanical properties are severely impaired by embrittlement, making the film unusable. This embrittlement occurs after as little as 48 hours of exposure to heat.

It was an object of the present invention to provide a white, sealable, flame-retardant and biaxially oriented polyester film which does not have the disadvantages of the prior-art films mentioned and in particular has very good sealability, can be produced cost-effectively, has improved processability, and has improved optical properties. It should particularly have flame-retardant action and not embrittle after exposure to heat.

It was an object of the present invention to extend the sealing range of the film to low temperatures, to increase the seal seam strength of the film, and at the same time to provide better handling of the film than is known from the prior art. It also has to be ensured that the processability of the film extends to high-speed processing machinery. It is intended that regrind arising directly during film production should be capable of reintroduction to the extrusion process at a concentration of up 60%, based on the total weight of the film, without any significant resultant adverse effect on the physical properties of the film.

Flame-retardant action means that in what is known as a fire protection test the film complies with the conditions of DIN 4102 Part 2 and in particular the conditions of DIN 4102 Part 1 and can be allocated to construction materials class B2 and in particular B1 for low-flammability materials.

It is also intended that the film pass the UL 94 "Vertical Burning Test for Flammability of Plastic Material" test so that it can be placed in class 94 VTM-0. This means that burning of the film has ceased 10 seconds after removal of the Bunsen burner, and that after 30 seconds no smoldering is observed, and also no burning drops arise.

Good mechanical properties include inter alia high modulus of elasticity ($E_{MD}$>3200 N/mm$^2$; $E_{TD}$>3500 N/mm$^2$) and also good values for tensile stress break (in MD>100 N/mm$^2$; in TD>130 N/mm$^2$).

Cost-effective production includes the capability of the raw materials or the raw material components needed to produce the flame-retardant film to be dried using commercially available industrial dryers, e.g. vacuum dryers, fluidized-bed dryers, or fixed-bed dryers (tower dryers). It is important that the raw materials do not cake and do not undergo thermal degradation.

No embrittlement on short-term exposure to heat means that after 100 hours of a heat-conditioning procedure at 100° C. in a circulating-air heating cabinet the film does not become brittle and does not have poor mechanical properties.

BRIEF DESCRIPTIONS OF THE INVENTION

According to the invention, the object is achieved by proving a white, sealable, flame-retardant, biaxially oriented polyester film with at least one base layer B, one sealable outer layer A, and one other outer layer C, where the sealable outer layer A has a minimum sealing temperature of ≦110° C., and a seal seam strength of ≧1.3 N/15 mm. The outer layer A preferably also has the following properties: average roughness $R_a$ less than 30 nm, value of from 500 to 4000 s measured for gas flow, and gloss greater than 120 (measurement angle 20°).

DETAILED DESCRIPTION OF THE INVENTION

The non-sealable outer layer C preferably has a coefficient of friction COF smaller than 0.5, average roughness $R_a$ of from 40 to 100 nm, a value of less than 120 s measured for gas flow, gloss smaller than 100 (measurement angle 20°) and a number N of elevations per mm$^2$ of film surface correlated with the respective height h via the following equations:

$$A_{C1} - B_{C1}*\log h/\mu < N_C/mm^2 < A_{C2} - B_{C2}*\log h/\mu m$$
$$0.01 \,\mu m < h < 10 \,\mu m$$
$$A_{C1} = 0.29 \quad B_{C1} = 3.30$$
$$A_{C2} = 1.84 \quad B_{C2} = 2.70$$

The whiteness of the polyester film is preferably greater than 70 and its planar orientation less than 0.165, together with compliance with construction materials classes B2 and B1 to DIN 4101 Part 2/Part 1 and passing of the UL 94 test.

The film of the invention comprises at least one flame retardant fed by way of what is known as masterbatch technology directly during film production, the concentration of the flame retardant being in the range from 0.5 to 30.0% by weight, preferably from 1.0 to 20.0% by weight, based on the weight of the thermoplastic. The ratio maintained between flame retardant and thermoplastic during masterbatch production is generally in the range from 60:40% by weight to 10:90% by weight.

Typical flame retardants include bromine compounds, chloroparaffins, and other chlorine compounds, antimony trioxide, and alumina trihydrates, but the halogen compounds are disadvantageous due to the halogen-containing by-products produced. Another extreme disadvantage is the low lightfastness of films provided therewith, alongside the evolution of hydrogen halides in the event of a fire.

Examples of suitable flame retardants used according to the invention are organophosphorus compounds, such as carboxyphosphinic acids, anhydrides of these, and dimethyl methylphosphonate. It is important for the invention that the organophosphorus compound is soluble in the thermoplastic, since otherwise the required optical properties are not obtained.

Since the flame retardants generally have some susceptibility to hydrolysis, it can be advisable to make concomitant use of a hydrolysis stabilizer.

For the hydrolysis stabilizer, preference is generally given to phenolic stabilizers, alkali metal/alkaline earth metal stearates, and/or alkali metal/alkaline earth metal carbonates in an amounts of from 0.01 to 1.0% by weight. For phenolic stabilizers, preference is given to amounts of from 0.05 to 0.6% by weight, in particular from 0.15 to 0.3% by weight, and a molar mass above 500 g/mol. Particularly advantageous compounds are pentaerythrityl tetrakis-3-(3,5-di-tert-butyl-4-hydroxyphenyl)propionate or 1,3,5-trimethyl-2,4,6-tris(3,5-di-tert-butyl-4-hydroxybenzyl)benzene.

According to the invention the film has at least three, layers, the layers encompassed then being the base layer B, the sealable outer layer A, and the outer layer C.

The base layer B of the film is preferably composed of at least 90% by weight of a thermoplastic polyester. Polyesters suitable for this purpose are those made from ethylene glycol and terephthalic acid (polyethylene terephthalate, PET), from ethylene glycol and naphthalene-2,6-dicarboxylic acid (polyethylene 2,6-naphthalate, PEN), from 1,4-bishydroxymethylcyclohexane and terephthalic acid (poly-1,4-cyclohexanedimethyleneterephthalate, PCDT), or else made from ethylene glycol, naphthalene-2, 6-dicarboxylic acid and biphenyl-4,4'-dicarboxylic acid (polyethylene 2,6-naphthalate dibenzoate, PENBB). Particular preference is given to polyesters at least 90 mol %, preferably at least 95 mol %, of which is composed of ethylene glycol units and terephthalic acid units, or of ethylene glycol units and naphthalene-2,6-dicarboxylic acid units. The remaining monomer units derive from other aliphatic, cycloaliphatic or aromatic diols and, respectively, dicarboxylic acids, as may also occur in the layer A (or in the layer C).

Other examples of suitable aliphatic diols are diethylene glycol, triethylene glycol, aliphatic glycols of the formula HO—(CH$_2$), —OH, where n is an integer from 3 to 6 (in particular 1,3-propanediol, 1,4-butanediol, 1,5-pentanediol and 1,6-hexanediol) and branched aliphatic glycols having up to 6 carbon atoms. Among the cycloaliphatic diols, mention should be made of cyclohexanediols (in particular 1,4-cyclohexanediol). Examples of other suitable aromatic diols have the formula HO—C$_6$H$_4$—X—C$_6$H$_4$—OH, where X is —CH$_2$—, —C(CH$_3$)$_2$—, —C(CF$_3$)$_2$—, —O—, —S— or —SO$_2$—. Bisphenols of the formula HO—C$_6$H$_4$—C$_6$H$_4$—OH are also very suitable.

Other aromatic dicarboxylic acids are preferably benzenedicarboxylic acids, naphthalene dicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x, x'-dicarboxylic acids. Among the cycloaliphatic dicarboxylic acids mention should be made of cyclohexanedicarboxylic acids (in particular cyclohexane-1,4-dicarboxylic acid). Among the aliphatic dicarboxylic acids, the $C_3$–$C_{19}$ alkanediacids are particularly suitable, and the alkane moiety here may be straight-chain or branched.

One way of preparing the polyesters is the transesterification process. Here, the starting materials are dicarboxylic esters and diols, which are reacted using the customary transesterification catalysts, such as the salts of zinc, of calcium, of lithium, of magnesium or of manganese. The intermediates are then polycondensed in the presence of well-known polycondensation catalysts, such as antimony trioxide or titanium salts. Another equally good preparation method is the direct esterification process in the presence of polycondensation catalysts. This starts directly from the dicarboxylic acids and the diols.

The sealable outer layer A applied by coextrusion to the base layer B is based on polyester copolymers and essentially consists of copolyesters composed predominantly of isophthalic acid units and of terephthalic acid units and of ethylene glycol units. The remaining monomer units are derived from other aliphatic, cycloaliphatic or aromatic diols and, respectively, dicarboxylic acids, as may also be present in the base layer. The preferred copolyesters which provide the desired sealing properties are those composed of ethylene terephthalate units and ethylene isophthalate units, and of ethylene glycol units. The proportion of ethylene terephthalate is from 40 to 95 mol % and the corresponding proportion of ethylene isophthalate is from 60 to 5 mol %. Preference is given to copolyesters in which the proportion of ethylene terephthalate is from 50 to 90 mol % and the corresponding proportion of ethylene isophthalate is from 50 to 10 mol %, and very particular preference is given to copolyesters in which the proportion of ethylene terephthalate is from 60 to 85 mol % and the corresponding proportion of ethylene isophthalate is from 40 to 15 mol %.

For the other, nonsealable outer layer C, or for any other intermediate layers present, use in principle may be made of the same polymers as described above for the base layer B.

The desired sealing and processing properties of the film of the invention are obtained from the properties of the copolyester used for the sealable outer layer combined with the topographies of the sealable outer layer A and the nonsealable outer layer C.

The minimum sealing temperature of not more than 110° C. and the seal seam strength of at least 1.3 N/15 mm of film width are achieved when the copolymers more particularly described above are used for the sealable outer layer A. The best sealing properties for the film are achieved when no other additives, in particular no inorganic or organic fillers, are added to the copolymer. For a given copolyester, this gives the lowest minimum sealing temperature and the highest seal seam strengths. However, in this case the handling of the film is poor, since the surface of the sealable outer layer A has a marked tendency to block. The film is difficult to wind and is not at all suitable for further processing on high-speed packaging machinery. To improve the handling of the film and its processability it is necessary to modify the sealable outer layer A. This is best done with the aid of suitable antiblocking agents of selected size, a certain amount of which is added to the sealable layer, and specifically in such a way as firstly to minimize blocking of the film and secondly to bring about only insignificant impairment of the sealing properties. Surprisingly, this desired combination of properties can be achieved when the topography of the sealable outer layer A is characterized by the following set of parameters:

The roughness of the sealable outer layer, expressed by the $R_a$, should be less than or equal to 30 nm. Otherwise the sealing properties for the purposes of the present invention are adversely affected.

The value measured for gas flow should be within the range from 500 to 4000 s. At values below 500 s, the sealing properties for the purposes of the present invention are adversely affected, while at values above 4000 s the handling of the film is impaired.

For further improvement in the processing properties of the sealable film, the topography of the nonsealable outer layer C should be characterized by the following set of parameters:

The coefficient of friction (COF) of this side with respect to itself should be less than or equal to 0.5. Otherwise the winding performance and further processing of the film are unsatisfactory.

The roughness of the nonsealable outer layer C, expressed as its $R_a$, should be $\geq 40$ nm and $\leq 150$ nm. $R_a$ values below 40 nm have adverse effects on the winding and processing performance of the film, while $R_a$ values above 100 nm impair the optical properties (gloss) of the film.

The value measured for gas flow for the outer layer C should be within the range below 120 s. At values above 120 s, the winding and processing performance of the film is adversely affected.

The number N of elevations per $mm^2$ of film surface is correlated with their respective heights h via the following equation:

$$0.29 - 3.30 \cdot \log h/\mu m < \log N/mm^2 < 1.84 - 2.70 \cdot \log h/\mu m$$

where $0.01\ \mu m < h < 10\ \mu m$

If the values for N are smaller than those given by the left-hand side of the inequality, the winding and processing performance of the film is adversely affected, and if the values for N are greater than given by the right-hand side of the equation, the gloss of the film are adversely affected.

In the three-layer embodiment, the flame retardant is preferably present in the non-sealable outer layer C. However, the base layer B, or even the sealable outer layer A, may also have been provided with flame retardants, if required. The concentration of the flame retardant(s) is based here on the weight of the thermoplastics in the layer provided with flame retardants.

Very surprisingly, fire tests DIN 4102 and the UL test have shown that in the case of a three-layer film it is fully sufficient for achievement of improved flame retardancy to provide flame retardant in (an) outer layer(s) of from 0.3 to 2.5 $\mu m$ thickness. If required and if fire protection requirements are stringent, the core layer may also have been provided with flame retardant, i.e. there may be what is known as a base level of provision.

The flame-retardant, multilayer films produced by known coextrusion technology are therefore more cost-effective, since they need markedly less flame retardant than monofilms provided with high concentrations throughout.

According to the invention, the flame retardant is added by way of masterbatch technology. The flame retardant is completely dispersed in a carrier material. Carrier materials which may be used are the polyethylene terephthalate or else other polymers compatible with the polyethylene terephthalate.

In masterbatch technology it is important that the particle size and the bulk density of the masterbatch are similar to the particle size and the bulk density of the thermoplastic, so that homogeneous distribution can take place, resulting in homogeneous flame retardancy.

It is important for the invention that the masterbatch which comprises the flame retardant and, where appropriate, the hydrolysis stabilizer is precrystallized or predried. This predrying includes progressive heating of the masterbatch at subatmospheric pressure (from 20 to 80 mbar, preferably from 30 to 60 mbar, in particular from 40 to 50 mbar), with stirring, and, where appropriate, post-drying at a constant elevated temperature, again at subatmospheric pressure. The masterbatch is preferably charged at room temperature from a feed vessel in the desired blend with the polymers of the base and/or outer layers and, where appropriate, with other raw material components, batchwise into a vacuum dryer which in the course of the drying time or residence time traverses a temperature profile of from 10 to 160° C., preferably from 20 to 150° C., in particular from 30 to 130° C. During the residence time of about 6 hours, preferably 5 hours, in particular 4 hours, the mixture of raw materials is stirred at from 10 to 70 rpm, preferably from 15 to 65 rpm, in particular from 20 to 60 rpm. The resultant precrystallized or predried raw material mixture is post-dried in a downstream vessel, likewise evacuated, at from 90 to 180° C., preferably from 100 to 170° C., in particular from 110 to 160° C., for from 2 to 8 hours, preferably from 3 to 7 hours, in particular from 4 to 6 hours.

The base layer B may also comprise conventional additives, such as stabilizers and/or antiblocking agents. The two other layers A and C may also comprise conventional additives, such as stabilizers and/or antiblocking agents. It is expedient to add the agents to the polymer or to the polymer mixture prior to melting. The stabilizers used advantageously comprise phosphorus compounds, for example, such as phosphoric acid or phosphoric esters.

Typical antiblocking agents (in this context also termed "pigments") are inorganic or organic particles, such as calcium carbonate, amorphous silica, talc, magnesium carbonate, barium carbonate, calcium sulfate, barium sulfate, lithium phosphate, calcium phosphate, magnesium phosphate, aluminum oxide, LiF, the calcium, barium, zinc or manganese salts of the dicarboxylic acids used, carbon black, titanium dioxide, kaolin, or crosslinked polystyrene particles or crosslinked acrylate particles.

The antiblocking agents selected may also be mixtures of two or more different antiblocking agents or mixtures of antiblocking agents of the same composition but of different particle size. The particles may be added to each layer in respective advantageous concentrations, e.g. as a glycolic dispersion during the polycondensation, or by way of masterbatches during extrusion.

Preferred particles are. $SiO_2$ in colloidal or in chain form. These particles become very well bound into the polymer matrix and create only very few vacuoles. Vacuoles generally cause haze and it is therefore appropriate to avoid these. There is no restriction in principle on the diameters of the particles used. However, it has proven appropriate for achieving the object to use particles with an average primary particle diameter below 100 nm, preferably below 60 nm and particularly preferably below 50 nm, measured by the sedigraph method, and/or particles with an average primary particle diameter not less than 1 µm, preferably not less than 1.5 µm and particularly preferably not less than 2 µm. However, the average particle diameter of these particles described last should not be above 5 µm.

To achieve the abovementioned properties, in particular the desired whiteness of the film, the base layer comprises the pigmentation needed for this purpose. Preferred suitable white pigments are titanium dioxide, barium sulfate, calcium carbonate, kaolin, and silicon dioxide, titanium dioxide and is barium sulfate being preferred. It has proved particularly advantageous here to use barium sulfate with a particle size of from 0.3 to 0.8 µm, preferably from 0.4 to 0.7 µm. This gives the film a brilliant white appearance without any yellow tinge.

The white pigment is likewise preferably fed by way of masterbatch technology, but may also be incorporated directly by the polymer producer. The concentration of the white pigment is from 12 to 40% by weight, preferably from 14 to 35% by weight, particularly preferably from 16 to 25% by weight, based on the weight of the layer of the polyester used.

In its advantageous usage form, the film is composed of three layers: the base layer B and, applied on both sides of this base layer, outer layers A and C, and outer layer A is sealable with respect to itself and with respect to outer layer C.

To achieve the property profile mentioned for the film, the outer layer C has more pigments (i.e. a higher pigment concentration) than the outer layer A. The pigment concentration in this second outer layer C is from 0.1 to 1.0% by weight, advantageously from 0.12 to 0.8% by weight and in particular from 0.15 to 0.6% by weight. In contrast, the other outer layer A, which is sealable and positioned opposite to the outer layer C, has a lower degree of filling with inert pigments. The concentration of the inert particles in layer A is from 0.01 to 0.2% by weight, preferably from 0.015 to 0.15% by weight and in particular from 0.02 to 0.1% by weight.

Between the base layer and the outer layers there may, if desired, also be an intermediate layer. This may again be composed of the polymers described for the base layers. In one particularly preferred embodiment, the intermediate layer is composed of the polyester used for the base layer. The intermediate layer may also comprise the customary additives described. The thickness of the intermediate layer is generally above 0.3 µm, preferably in the range from 0.5 to 15 µm, in particular in the range from 1.0 to 10 µm and particularly preferably in the range from 1.0 to 5 µm.

In the particularly advantageous three-layer-embodiment of the novel film, the thickness of the outer layers (A) and (C) is generally above 0.1 µm, and is generally in the range from 0.2 to 4.0 µm, particularly preferably in the range from 0.2 to 3.5 µm, in particular in the range from 0.3 to 3 µm and very particularly preferably in the range from 0.3 to 2.5 µm, and the thicknesses of the outer layers (A) and (C) may be identical or different.

The total thickness of the novel polyester film may vary. It is from 5 to 350 µm, in particular from 5 to 300 µm, preferably from 5 to 250 µm, the layer B preferably making up from 5 to 90% of the total thickness.

The invention also provides a process for producing the polyester film of the invention by the coextrusion method known per se.

The polymers for the base layer B and the two outer layers (A) and (C) are introduced to three extruders. Any foreign bodies or contamination present may be removed from the polymer melt by means of suitable filters prior to extrusion. The melts are then extruded in a coextrusion die to give flat melt films, and layered one upon the other. The multilayer film is then drawn off and solidified with the aid of a chill roll and, if desired, other rolls.

The film is then biaxially stretched (oriented), heat-set and, where appropriate, corona- or flame-treated on the surface intended for treatment.

The biaxial orientation is generally carried out sequentially, and preference is given here to sequential biaxial orientation in which orientation is first longitudinal (in MD, i.e. the machine direction) and then transverse (in TD, i.e. perpendicularly to the machine direction). This gives orientation of the molecular chains. The longitudinal orientation can be carried out with the aid of two rolls running at different speeds corresponding to the desired stretching ratio. For the transverse orientation, use is generally made of an appropriate tenter frame.

The temperature at which the orientation is carried out may vary over a relatively wide range and depends on the film properties desired. The longitudinal stretching is generally carried out at from about 80 to 130° C., and the transverse stretching at from about 80 to 150° C. The longitudinal stretching ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1. Prior to the transverse stretching, one or both surfaces of the film may be in-line coated by known processes. The in-line coating may serve, for example, to give improved adhesion of a metal layer or of any printing ink applied, or else to improve antistatic performance or processing performance.

For producing a film with very good sealing properties it has proven advantageous for the planar orientation $\Delta p$ of the film to be less than 0.168, but particularly less than 0.165. In this case the strength of the film in the direction of its thickness is so great that when the seal seam strength is measured it is specifically the seal seam which separates, and the tear does not enter the film or propagate therein.

The significant variables affecting the planar orientation $\Delta p$ have been found to be the longitudinal and transverse stretching parameters, and also the SV (standard viscosity) of the raw material used. The processing parameters include in particular the longitudinal and transverse stretching ratios ($\lambda_{MD}$ and $\lambda_{TD}$), the longitudinal and transverse stretching temperatures ($T_{MD}$ and $T_{TD}$), the film web speed and the nature of the stretching, in particular that in the longitudinal direction of the machine. For example, if the planar orientation $\Delta p$ obtained with a machine is 0.169 with the following set of parameters: $\lambda_{MD}$=4.8 and $\lambda_{TD}$=4.0, a longitudinal stretching temperature $T_{MD}$ of from 80–118° C. and a transverse stretching temperature $T_{TD}$ of from 80–125° C., then increasing the longitudinal stretching temperature $T_{MD}$ to 80–125° C. or increasing the transverse stretching temperature $T_{TD}$ to 80–135° C., or lowering the longitudinal stretching ratio $\lambda_{MD}$ to 4.3 or lowering the transverse stretching ratio $\lambda_{TD}$ to 3.7 gives a planar orientation $\Delta p$ within the desired range. The film web speed here was 340 m/min and the SV (standard viscosity) of the material was about 730. For the longitudinal stretching, the data mentioned are based on what is known as N-TEP stretching, composed of a low-orientation stretching step (LOE, Low Orientation Elongation) and a high-orientation stretching step (REP, Rapid Elongation Process). Other stretching systems in principle give the same ratios, but the numeric values for each process parameter may be slightly different. The temperatures given are based on the respective roll temperatures in the case of the longitudinal stretching and on infrared-measured film temperatures in the case of the transverse stretching.

In the heat-setting which follows, the film is held for from 0.1 to 10 s at a 30 temperature of from 150 to 250° C. The film is then wound up in a usual manner.

After the biaxial stretching it is preferable for one or both surfaces of the film to be corona- or flame-treated by one of the known methods. The intensity of the treatment is generally in the range above 45 mN/m.

The film may also be coated in order to achieve other desired properties. Typical coatings are layers with adhesion-promoting, antistatic, slip-improving or release action. These additional layers may, it will be appreciated, be applied to the film by way of in-line coating, using aqueous dispersions, prior to the transverse stretching step.

The novel film has excellent sealability, very good handling properties and very good processing performance. The sealable outer layer A of the film seals not only with respect to itself (fin sealing) but also with respect to the nonsealable outer layer C (lap sealing). The minimum sealing temperature for lap sealing here is only about 10 K higher, and the deterioration in the seal seam strength is not more than 0.3 N/15 mm.

During production of the film it was found that the use of masterbatch technology, suitable predrying or precrystallization of the masterbatch, and the use of small concentrations of hydrolysis stabilizer permit the flame-retardant film to be produced with no caking in the dryer. Nor were any evolution of gases or any deposits observed during the production process.

Measurements also showed that the film of the invention does not embrittle on exposure to temperatures of 100° C. for a prolonged period. This is more than surprising, and this result is attributable to the synergistic action of appropriate precrystallization, predrying, masterbatch technology, and hydrolysis stabilizer.

The film of the invention may moreover be recycled without difficulty, without polluting the environment, and without loss of mechanical properties, and is therefore suitable for use as short-lived advertising placards, for example, or in the construction of exhibition stands, and for other promotional items, where fire protection is desired.

Surprisingly, films of the invention comply with construction materials classifications B2 and B1 to DIN 4102 and pass the UL 94 test at a range of thicknesses extending as far as from 5 to 350 $\mu$m.

The film also has impressive and excellent (Berger) whiteness of >70, which also gives the film very attractive appearance which is effective for promotional purposes.

It has been ensured that regrind can be reintroduced to the extrusion process during film production at a concentration of from 20 to 60% by weight, based on the total weight of the film, without any significant resultant adverse effect on the physical properties of the film.

The excellent sealing properties and very good handling of the film, and its very good processing properties, make it particularly suitable for processing on high-speed machinery.

The excellent combination of properties in the film also makes it suitable for a wide variety of different applications, for example for interior decoration, for the construction of exhibition stands, for exhibition requisites, as displays, for blackouts, for protecting glazing of machinery or of vehicles, in the lighting sector, in the fitting out of shops or of stores, as a promotional item, as a laminating medium, for greenhouses, roofing systems, exterior cladding, protective coverings for materials, e.g. steel plate, applications in the construction sector, and illuminated advertising profiles, blinds, and electrical applications.

The most important film properties according to the invention can be seen again at a glance in the table below (Table 1).

TABLE 1

|  | Inventive range | Preferred | Particularly preferred | Unit | Test method |
|---|---|---|---|---|---|
| Outer layer A | | | | | |
| Minimum sealing temperature | <110 | <105 | <100 | ° C. | internal |
| Seal seam strength | >1.3 | >1.5 | >1.8 | N/15 mm | internal |
| Average roughness $R_a$ | <30 | <25 | <20 | nm | DIN 4768, cut-off at 0.25 mm |
| Vvalue measured for gas flow | 500–4000 | 800–3500 | 1000–3000 | sec | internal |
| Gloss, 20° | >120 | >130 | >140 | | DIN 67 530 |
| Outer layer C | | | | | |
| COF | <0.5 | <0.45 | <0.40 | | DIN 53 375 |
| Average roughness $R_a$ | 40–100 | 45–95 | 50–90 | nm | DIN 4768, cut-off at 0.25 mm |
| Value measured for gas flow | <120 | <100 | <80 | sec | internal |
| Gloss, 20° | >140 | >150 | >160 | | DIN 67 530 |
| Other film properties | | | | | |
| Whiteness | >70 | <75 | >80 | % | Berger |
| Planar orientation | <0.165 | <0.163 | <0.160 | | internal |
| Fire performance | The film complies with construction material classes B2 and B1 to DIN 4102 Part 2/Part 1 and passes the UL 94 test | | | | |

The following values were measured to characterize the raw materials and the films:

Test Methods

SV (DCA), IV (DCA)

Standard viscosity SV (DCA) is measured by a method based on DIN 53726, in dichloroacetic acid.

Intrinsic viscosity (IV) is calculated as follows from standard viscosity $$IV(DCA) = 6.67 \cdot 10^4 SV(DCA) + 0.118$$

Minimum Sealing Temperature

Hot-sealed specimens (seal seam 20 mm×100 mm) are produced with a Brugger HSG/ET sealing apparatus, by sealing the film at different temperatures with the aid of two heated sealing jaws at a sealing pressure of 2 bar and with a sealing time of 0.5 s. From the sealed specimens test strips of 15 mm width were cut. The T-seal seam strength was measured as in the determination of seal seam strength. The minimum sealing temperature is the temperature at which a seal seam strength of at least 0.5 N/15 mm is achieved.

Seal Seam Strength

To determine seal seam strength, two film strips of width 15 mm were placed one on top of the other and sealed at 130° C. with a sealing time of 0.5 s and a sealing pressure of 2 bar (apparatus: Brugger model NDS, single-side-heated sealing jaw). The seal seam strength was determined by the T-peel method.

Coefficient of Friction

Coefficient of friction was determined to DIN 53 375. The coefficient of sliding friction was measured 14 days after production.

Surface Tension

Surface tension was determined by what is known as the ink method (DIN 53 364).

Gloss

Gloss was determined to DIN 67 530. Reflectance was measured, this being an optical value characteristic of a film surface. Based on the standards ASTM-D 523-78 and ISO 2813, the angle of incidence was set at 20° or 60°. A beam of light hits the flat test surface at the set angle of incidence and is reflected and/or scattered thereby. A proportional electrical variable is displayed representing light rays hitting the photoelectronic detector. The value measured is dimensionless and must be stated together with the angle of incidence.

Determination of Particle Sizes on Film Surfaces

A scanning electron microscope and an image analysis system are used to determine the size distribution of elevations on film surfaces. Use is made of the XL30 CP scanning electron microscope from Philips with an integrated image analysis program: AnalySIS from Soft-Imaging System.

For these measurements, specimens of film are placed flat on a specimen holder. These are then metallized obliquely at an angle a with a thin metallic layer (e.g. of silver). The symbol a here is the angle between the surface of the specimen and the direction of diffusion of the metal vapor. This oblique metallization throws a shadow behind the elevation. Since the shadows are not at this stage electrically conductive, the specimen is then further sputtered or metallized with a second metal (e.g. gold), the second coating here impacting vertically onto the surface of the specimen in such a way as not to produce any shadows in the second coating.

Scanning electron microscope (SEM) images are taken of the specimen surfaces prepared in this way. The shadows of the elevations are visible because of the contrast of the metallic materials. The specimen is oriented in the SEM in such as way that the shadows run parallel to one edge of the image. The following conditions are set in the SEM for recording the image: secondary electron detector, operating distance 10 mm, acceleration voltage 10 kV and spot 4.5. The brightness and contrast are set in such a way that all of the information in the image is represented as gray values and the intensity of the background noise is sufficiently small for it not to be detected as a shadow. The length of the shadows is measured by image analysis. The threshold value for shadow identification is set at the point where the second derivative of the gray value distribution of the image passes through the zero point. Before shadow identification, the image is smoothed with an N×N filter (size 3, 1 iteration). A frame is set so as to ensure that elevations which are not reproduced in their entirety in the image are not included in the measurements. The magnification, the size of the frame and the number of images evaluated are selected in such a way that a total film surface of 0.36 $mm^2$ is evaluated.

The height of the individual elevations is computed from the individual shadow lengths using the following relationship:

$$h=(\tan a)*L$$

where h is the height of the elevation, a is the metallization angle and L is the shadow length. The elevations recorded in this way are classified so as to arrive at a frequency distribution. The classification is into classes of 0.05 mm width between 0 and 1 mm, the smallest class (from 0 to 0.05 mm) not being used for further evaluation calculations. The diameters (dimension perpendicular to the direction of shadow throw) of the elevations are classified in a similar way in classes of 0.2 mm width from 0 to 10 mm, and here again the smallest class is again used for further evaluation.

Surface Gas Flow Time

The principle of the test method is based on the air flow between one side of the film and a smooth silicon wafer sheet. The air flows from the surroundings into an evacuated space, and the interface between film and silicon wafer sheet acts as a flow resistance.

A round specimen of film is placed on a silicon wafer sheet in the middle of which there is a hole providing the connection to the receiver. The receiver is evacuated to a pressure below 0.1 mbar. The time in seconds taken by the air to establish a pressure rise of 56 mbar in the receiver is determined.

Test Conditions:

| | |
|---|---|
| Test area | 45.1 cm² |
| Weight applied | 1276 g |
| Air temperature | 23° C. |
| Humidity | 50% relative humidity |
| Aggregated gas volume | 1.2 cm³ |
| Pressure difference | 56 mbar |

Determination of Planar Orientation Δp

Planar orientation is determined by measuring the refractive index with an Abbe refractometer.

Preparation of Specimens

Specimen size and length: from 60 to 100 mm

Specimen width: corresponds to prism width of 10 mm

To determine $n_{MD}$ and $n_a$ (=$n_2$), the specimen to be tested has to be cut out from the film with the running edge of the specimen running precisely in the direction TD. To determine $n_{TD}$ and $n_a$(=$n_z$), the specimen to be tested has to be cut out from the film with the running edge of the specimen running precisely in the direction MD. The specimens are to be taken from the middle of the film web. Care must be taken that the temperature of the Abbe refractometer is 23° C. Using a glass rod, a little diiodomethane (N=1.745) or diiodomethane-bromonaphthalene mixture is applied to the lower prism, which has been cleaned thoroughly before the test. The refractive index of the mixture must be greater than 1.685. The specimen cut out in the direction TD is firstly laid on top of this, in such a way that the entire surface of the prism is covered. Using a paper wipe the film is now firmly pressed flat onto the prism, so that it is firmly and smoothly positioned thereon. The excess liquid must be sucked away. A little of the test liquid is then dropped onto the film. The second prism is swung down and into place and pressed firmly into contact. The right-hand knurled screw is then used to turn the indicator scale until a transition from light to dark can be seen in the field of view in the range from 1.62 to 1.68. If the transition from light to dark is not sharp, the colors are brought together using the upper knurled screw in such a way that only one light and one dark zone are visible. The sharp transition line is brought to the crossing point of the two diagonal lines (in the eyepiece) using the lower knurled screw. The value now indicated on the measurement scale is read off and entered into the test record. This is the refractive index $n_{MD}$ in the machine direction. The scale is now turned using the lower knurled screw until the range visible in the eyepiece is from 1.49 to 1.50.

The refractive index $n_a$ or $n_z$ (in the direction of the thickness of the film) is then determined. To improve the visibility of the transition, which is only weakly visible, a polarization film is placed over the eyepiece. This is turned until the transition is clearly visible. The same considerations apply as in the determination of $n_{MD}$. If the transition from light to dark is not sharp (colored), the colors are brought together using the upper knurled screw in such a way that a sharp transition can be seen. This sharp transition line is brought into the crossing point of the two diagonal lines using the lower knurled screw, and the value indicated on the scale is read off and entered into the table.

The specimen is then turned, and the corresponding refractive indices $n_{MD}$ and $n_a$ (=$n_z$) of the other side are measured and entered into an appropriate table.

After determining the refractive indices in, respectively, the direction MD and the direction of the thickness of the film, the specimen strip cut out in the direction MD is placed in position and the refractive indices $n_{TD}$ and $n_a$ (=$n_z$) are determined accordingly. The strip is turned over, and the values for the B side are measured. The values for the A side and the B side are combined to give average refractive indices. The orientation values are then calculated from the refractive indices using the following formulae:

$$\Delta n = n_{MD} - n_{TD}$$

$$\Delta p = (n_{MD} + n_{TD})/2 - n_z$$

$$n_{av} = (n_{MD} + n_{TD} + n_z)/3$$

Surface Defects

Surface defects were determined visually.

Mechanical Properties

Modulus of elasticity, and tensile stress at break are measured longitudinally and tranversely to ISO 527-1-2.

Fire Performance

Fire performance is determined to DIN 4102 Part 2, construction materials class B2 and to DIN 4102 Part 1, construction materials class B1, and also by the UL 94 test.

EXAMPLES

Example 1

Chips made from polyethylene terephthalate (prepared by the transesterification process with Mn as transesterification catalyst, Mn concentration: 100 ppm) were dried at 150° C. to residual moisture below 100 ppm and, together with the stated masterbatches, fed to the extruder for the base layer B. Chips made from polyethylene terephthalate were likewise fed, together with the masterbatches stated, to the extruder for the nonsealable outer layer C.

Alongside this, chips were prepared made from a linear polyester which is composed of an amorphous copolyester with 78 mol % of ethylene terephthalate and 22 mol % of ethylene isophthalate (prepared via the transesterification process with Mn as transesterification catalyst, Mn concentration: 100 ppm). The copolyester was dried at a temperature of 100° C. to a residual moisture below 200 ppm and, together with the masterbatches stated, fed to the extruder for the sealable outer layer A.

Barium sulfate was used as white pigment.

The hydrolysis stabilizer and the flame retardant are fed in the form of a masterbatch. The masterbatch is composed of 20% by weight of flame retardant, 1% by weight of hydrolysis stabilizer, and 79% by weight of polyethylene terephthalate. The hydrolysis stabilizer is pentaerythrityl tetrakis-3-(3,5-di-tert-butyl-4-hydroxyphenyl)propionate. The flame retardant is dimethyl methylphosphonate (®Armgard P 1045). The bulk density of the masterbatch is 750 kg/m$^3$ and its softening point is 69° C.

The masterbatch was charged at room temperature from separate feed vessels into a vacuum dryer which traverses a temperature profile of from 25 to 130° C. from the moment of charging to the end of the residence time. During the residence time of about 4 hours the masterbatch is stirred 61 rpm. The precrystallized or predried masterbatch is post-dried in a downstream hopper, likewise at subatmospheric pressure, for 4 hours at 140° C.

10% by weight of the masterbatch are added to the base layer B and 20% by weight of the masterbatch are added to the non-sealable outer layer C.

Coextrusion followed by stepwise longitudinal and transverse orientation was then used to produce a transparent, three-layer film with ABC structure and with a total thickness of 12 µm. The thickness of each outer layer can be seen in Table 2.

Outer layer (A), a mixture made from:

- 97.0% by weight of copolyester with an SV of 800
- 3.0% by weight of masterbatch made from 97.75% by weight of copolyester (SV of 800) and 1.0% by weight of ® Sylobloc 44 H (synthetic SiO$_2$ from Grace) and 1.25% by weight of ® Aerosil TT 600 (fumed SiO$_2$ from Degussa)

Base layer B:

- 70.0% by weight of polyethylene terephthalate with an SV of 800
- 20.0% by weight of barium sulfate with average particle size of 0.5 µm
- 10.0% by weight of masterbatch which comprises flame retardant and hydrolysis stabilizer Outer layer C, a mixture made from:

- 20.0% by weight of masterbatch which comprises flame retardant and hydrolysis stabilizer
- 68% by weight of polyethylene terephthalate with an SV of 800
- 12% by weight of masterbatch made from 97.75% by weight of copolyester (SV of 800) and 1.0% by weight of ® Sylobloc 44 H (synthetic SiO$_2$ from Grace) and 1.25% by weight of ® Aerosil TT 600 (chain-type SiO$_2$ from Degussa)

The production conditions in each step of the process were:

| | |
|---|---|
| Longitudinal stretching Temperature: | 80–125° C. |
| Longitudinal stretching ratio: | 4.2 |
| Transverse stretching Temperature: | 80–135° C. |
| Transverse stretching ratio: | 4 |
| Setting: | |
| Temperature: | 230° C. |
| Duration: | 3 s |

The film had the good sealing properties demanded, the desired whiteness, the desired handling properties and the desired processing performance. Tables 2 and 3 (film structure and results) show the structures of the films and the properties achieved in films produced in this way.

Mechanical properties are unchanged after 200 hours of heat-conditioning at 100° C. in a circulating-air drying cabinet. The film exhibits no embrittlement phenomena of any kind. The film complies with construction materials classes B2 and B1 to DIN 4102 Part 2 and Part 1. The film passes the UL 94 test.

Example 2

As Example 1, except that the outer layer thickness for the sealable layer (A) was raised from 1.5 to 2.0 µm. This gives an improvement in the sealing properties, and in particular a marked improvement in seal seam strength.

Example 3

As Example 1, except that a film of 30 µm thickness was produced. The outer layer thickness for the sealable layer A was 2.5 µm and the thickness for the nonsealable layer C was 2.0 µm. This again gives an improvement in sealing properties, and in particular a marked improvement in seal seam strength. Again, there has been a slight improvement in the handling of the film.

Example 4

As Example 3, except that the copolymer for the sealable outer layer A was changed. Instead of the amorphous copolyester having 78 mol % of polyethylene terephthalate and 22 mol % of ethylene isophthalate, use was made of an amorphous copolyester having 70 mol % of polyethylene terephthalate and 30 mol % of ethylene isophthalate. The polymer was processed on a vented twin-screw extruder without any need for predrying. The outer layer thickness for the sealable layer A was again 2.5 µm, and the thickness of the nonsealable layer C was 2.0 µm. This improved the sealing properties, and in particular there was a marked improvement in the seal seam strength. To achieve good handling and good processing performance from the film, the pigment concentration in the two outer layers was slightly raised (see Tables 2 and 3).

Comparative Example 1

As Example 1, except that the sealable outer layer (A) was unpigmented. Although this has improved the sealing properties somewhat, the handling of the film and its processing performance have deteriorated unacceptably (see Tables 2 and 3).

Comparative Example 2

As Example 1, except that the sealable outer layer (A) had the same pigmentation level as the nonsealable outer layer (C). This measure has improved the handling and the processing properties of the film, however the sealing properties have become markedly poorer (see Tables 2 and 3).

Comparative Example 3

As Example 1, except that the nonsealable outer layer (A) was given markedly less pigmentation. The handling and processing performance of the film has become markedly poorer (see Tables 2 and 3).

Comparative Example 4

Example 1 from EP-A-0 035 835 was repeated. The sealing performance of the film, its handling properties and its processing performance are poorer than in the examples according to the invention (see Tables 2 and 3).

TABLE 2

| Example | Film thickness μm | Film structure | Layer thickness μm A | B | C | Pigments in layers A | B | C | Average pigment diameter in layers mm A | B | C | Pigment concentrations ppm A | B | C |
|---|---|---|---|---|---|---|---|---|---|---|---|---|---|---|
| E 1 | 20 | ABC | 1.5 | 17 | 1.5 | Sylobloc 44 H / Aerosil TT 600 | none | Sylobloc 44 H / Aerosil TT 600 | 2.5 / 0.04 | | 2.5 / 0.04 | 300 / 375 | 0 | 1200 / 1500 |
| E 2 | 20 | ABC | 2.0 | 16.5 | 1.5 | Sylobloc 44 H / Aerosil TT 600 | none | Sylobloc 44 H / Aerosil TT 600 | 2.5 / 0.04 | | 2.5 / 0.04 | 300 / 375 | 0 | 1200 / 1500 |
| E 3 | 20 | ABC | 2.5 | 25.5 | 2.0 | Sylobloc 44 H / Aerosil TT 600 | none | Sylobloc 44 H / Aerosil TT 600 | 2.5 / 0.04 | | 2.5 / 0.04 | 300 / 375 | 0 | 1200 / 1500 |
| E 4 | 30 | ABC | 2.5 | 25.5 | 2.0 | Sylobloc 44 H / Aerosil TT 600 | none | Sylobloc 44 H / Aerosil TT 600 | 2.5 / 0.04 | | 2.5 / 0.04 | 400 / 500 | 0 | 1500 / 1875 |
| CE 1 | 20 | ABC | 1.5 | 17 | 1.5 | none | none | Sylobloc 44 H / Aerosil TT 600 | | | 2.5 / 0.04 | | 0 | 1200 / 1500 |
| CE 2 | 20 | ABC | 1.5 | 17 | 1.5 | Sylobloc 44 H / Aerosil TT 600 | none | Sylobloc 44 H / Aerosil TT 600 | 2.5 / 0.04 | | 2.5 / 0.04 | 300 / 375 | 0 | 1200 / 1500 |
| CE 3 | 20 | ABC | 1.5 | 17 | 1.5 | Sylobloc 44 H / Aerosil TT 600 | none | Sylobloc 44 H / Aerosil TT 600 | 2.5 / 0.04 | | 2.5 / 0.04 | 300 / 375 | 0 | 600 / 750 |
| CE 4 | 15 | AB | 2.25 | 12.75 | | Gasil 35 EP-A-035 835 | none | | 3 | | | 2500 | 0 | |

TABLE 3

| Example | Minimum sealing temperature °C. Side A with respect to side A | Seal seam strength N/15 mm Side A with respect to side A | Coefficient of friction COF Side C with respect to side C | Average roughness $R_a$ nm Side A | Side C | Values measured for gas flow sec Side A | Side C | Constants A/B A | C | Dp | Gloss Side A | Side C | Winding performance and handling | Processing performance |
|---|---|---|---|---|---|---|---|---|---|---|---|---|---|---|
| E 1 | 100 | 2.0 | 0.45 | 25 | 65 | 1200 | 120 | 0.5 | 3.06 | 0.165 | 140 | 170 | ++ | ++ |
| E 2 | 98 | 2.7 | 0.45 | 26 | 65 | 1280 | 120 | 0.5 | 3.06 | 0.165 | 140 | 170 | ++ | ++ |
| E 3 | 95 | 3.0 | 0.41 | 23 | 61 | 1110 | 120 | 0.5 | 3.06 | 0.165 | 130 | 170 | ++ | ++ |
| E 4 | 85 | 3.3 | 0.40 | 23 | 65 | 1300 | 110 | 0.5 | 3.06 | 0.165 | 130 | 170 | ++ | ++ |
| CE 1 | 98 | 2.1 | 0.45 | 10 | 65 | 10,000 | 80 | | | 0.165 | 160 | 170 | – | – |
| CE 2 | 110 | 1.0 | 0.45 | 65 | 65 | 80 | 80 | | | 0.165 | 130 | 170 | – | – |
| CE 3 | 100 | 2.0 | 0.45 | 25 | 37 | 1200 | 150 | | | 0.165 | 160 | 190 | – | – |
| CE 4 | 115 | 0.97 | >2 | 70 | 20 | 50 | >5000 | | | | | | – | – |

Key to winding performance, handling, and processing performance of films:
++: no tendency to stick to rolls or to other mechanical parts, no blocking problems on winding or during processing on packaging machinery, low production costs
–: tendency to stick to rolls or to other mechanical parts, blocking problems on winding and during processing on high-speed machinery, high production costs due to complicated handling of film in machinery

What is claimed is:

1. A white, sealable, flame-retardant, biaxially oriented polyester film with at lest one base layer B, one sealable outer layer A, and one outer layer C, which film contains a flame retardant in at least one layer, where the scalable outer layer A has a minimum sealing temperature of ≦110° C., a seal seam strength of ≧1.3 N/15 mm and the range of gas flow values measured for the sealable outer layer A are from 500 to 4000 s.

2. The polyester film as claimed in claim 1, wherein the average roughness $R_a$ of the sealable outer layer A is below 30 nm.

3. The polyester film as claimed in claim 1, wherein the gloss of the sealable outer layer A is above 120 (angle of measurement 20°).

4. The polyester film as claimed in claim 1, wherein the coefficient of friction COF of the nonsealable outer layer C is below 0.5.

5. The polyester lm as claimed in claim 1, wherein the average roughness $R_a$ of the nonsealable outer layer C is from 40 to 100 nm.

6. The polyester film as claimed in claim 1, wherein the glass of the nonsealable outer layer C is below 100 (angle of measurement 20°).

7. The polyester film as claimed in claim 1, wherein the whiteness of the polyester film is above 70.

8. The polyester film as claimed in claim 1, wherein the planar orientation of the polyester film is below 0.16 5.

9. The polyester film as claimed in claim 1, where at least 90% by weight of the base layer B is composed of a thermoplastic polyester selected from the group consisting of PET, PEN, PCDT and PENBB, and the other monomer units derive from other aliphatic, cycloaliphatic or aromatic diols and, respectively, dicarboxylic acids.

10. The polyester film as claimed in claim 1, where at least 95% by weight of the base layer B is composed of a thermoplastic polyester selected from the group consisting of PET and PEN.

11. The polyester film as claimed in claim 1, where the thickness of the sealable outer layer A is from 0.2 to 4.0 μm.

12. The polyester film as claimed in claim 1, where at least 95% by weight of the nonsealable outer layer C is composed of a thermoplastic polyester selected from the group consisting of PET, PEN, PCDT and PENBB.

13. The polyester film as claimed in claim 1, where the thickness of the nonsealable outer layer C is from 0.2 to 4.0 μm.

14. The polyester film as claimed in claim 1, where the flame retardant is present in the nonsealable outer layer C.

15. The polyester film as claimed in claim 1, where the flame retardant is selected from one or more organic phosphorus compounds which are soluble in polyethylene terephthalate.

16. The polyester film as claimed in claim 1, where the concentration of the flame retardant is from 0.5 to 30.0% by weight, based on the weight of the layer in which the flame retardant has been used.

17. The polyester film as claimed in claim 1, where a white pigment is present in the base layer B.

18. The polyester film as claimed in claim 17, where the white pigment is selected from one or more of titanium dioxide, barium sulfate, calcium carbonate, kaolin and silicon dioxide.

19. The polyester film as clamed in claim 18, where the white pigment is barium sulfate.

20. The polyester film as claimed in claim 17, where the film comprises from 12 to 40% by weight of white pigment, based on the weight of the layer in which the white pigment is present.

21. The polyester film as claimed in claim 17, where the average particle size of the white pigment barium sulfate is from 0.3 to 0.8 μm.

22. The polyester film as claimed in claim 1, where the film further has an intermediate layer between base layer B and the outer layer A or C or A and C.

23. A process for producing a polyester film as clamed in claim 1, which comprises comprising and plasticizing a polymer or a polymer mixture for the individual layers in an extruder, then simultaneously extruding the melts through a flat-film die (slot die), drawing off the extruded multilayer film on one or more take-off rolls, then biaxially stretching and heat-setting the resultant film.

24. The process as claimed in claim 23, wherein a flame retardant is added by way of masterbatch technology.

25. The process as claimed in claim 23, wherein a white pigment is added by way of masterbatch technology.

26. A method of making an interior decoration, a display, a placards, a protective glazing, a shop outfit, a promotional requisite, a laminating medium, an exterior cladding, a protective covering, an illuminated advertising profile, a roofing system or a blind, which comprises converting a film as claimed in claim 1 into an interior decoration, a display, a placards, a protective glazing, a shop outfit, a promotional requisite, a laminating medium, an exterior cladding, a protective covering, an illuminated advertising profile, a roofing system or a blind.

27. The polyester as claimed in claim 1, wherein the sealable outer layer A is formed from polyester copolymers comprising ethylene terephthalate units and ethylene isophthalate units and the outer layers further comprise at least one antiblocking agent, said outer layer C having a higher concentration of said antiblocking agent than said sealable outer layer A.

28. The polyester as claimed in claim 27, wherein the concentration of antiblocking agent is from 0.1 to 1% by weight in the outer layer C and from 0.01 to 0.2% by weight in the outer layer A.

29. A polyester film according to claim 1, said polyester film further comprising a predried or precrystallized masterbatch composition that comprises at least one flame retardant and a carrier material.

30. A polyester film according to claim 29, said predried or precrystallized masterbatch composition further comprising at least one hydrolysis stabilizer.

31. A polyester film according to claim 1, wherein said base layer B comprises white pigment, said sealable outer layer A comprises a polyester copolymer and further includes a first amount of an antiblocking agent, said outer layer C comprises a second amount of an antiblocking agent and said flame retardant, and said second amount of antiblocking agent is greater than said first amount of antiblocking agent.

32. A white, sealable, flame-retardant, biaxially oriented polyester film with at least one base layer B, one sealable outer layer A, and one outer layer C, which film contains a flame retardant in at least one layer, where the scalable outer layer A has a minimum sealing temperature of <110° C. a seal seam strength of >1.3 N/15 nm and wherein the gas flow values measured for the nonsealable outer layer C are below 120 s.

33. A white, sealable, flame-retardant, biaxially oriented polyester film, with at least one base layer B, one sealable outer layer A, and one outer layer C, which film contains a flame retardant in at least one layer, where the sealable outer layer A has a minimum sealing temperature of <110° C., a seal seam strength of >1.3 N/15 mm and wherein the sealable outer layer A comprises polyester copolymers consisting essentially of ethylene terephthalate units and ethylene isophthalate units.

34. The polyester film as claimed in claim 33, wherein the ethylene terephthalate units content in the copolymer is from 40 to 95 mol % and the ethylene isophthalate units content in the copolymer is from 60 to 5 mol %.

* * * * *